(12) United States Patent
Krafft et al.

(10) Patent No.: US 10,274,015 B2
(45) Date of Patent: Apr. 30, 2019

(54) BEARING FOR A PUMP AND METHOD OF RETROFITTING A BEARING FOR A PUMP

(71) Applicant: Sulzer Management AG, Winterthur (CH)

(72) Inventors: Steven Krafft, Chattanooga, TN (US); Ronrick Pemberton, Portland, OR (US)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 15/523,064

(22) PCT Filed: Sep. 29, 2015

(86) PCT No.: PCT/EP2015/072422
§ 371 (c)(1),
(2) Date: Apr. 28, 2017

(87) PCT Pub. No.: WO2016/078813
PCT Pub. Date: May 26, 2016

(65) Prior Publication Data
US 2017/0328411 A1 Nov. 16, 2017

Related U.S. Application Data

(60) Provisional application No. 62/081,869, filed on Nov. 19, 2014.

(51) Int. Cl.
*F04D 29/06* (2006.01)
*F16C 33/10* (2006.01)
(Continued)

(52) U.S. Cl.
CPC ...... *F16C 33/6666* (2013.01); *F04D 29/0473* (2013.01); *F04D 29/061* (2013.01);
(Continued)

(58) Field of Classification Search
CPC .............. F16C 33/1045; F16C 33/6666; F16C 2237/00; F16C 2360/44; F04D 29/0473; F04D 29/061
(Continued)

(56) References Cited

U.S. PATENT DOCUMENTS

| 1,908,379 A | 5/1933 | Todd |
| 2,445,432 A | 7/1948 | Hodell |

(Continued)

FOREIGN PATENT DOCUMENTS

| JP | S59183541 U | 12/1984 |
| JP | H687720 U | 12/1994 |

OTHER PUBLICATIONS

International Search Report dated Nov. 10, 2015 in corresponding International Patent Application No. PCT/EP2015/072422, filed Sep. 29, 2015.

*Primary Examiner* — James Pilkington
(74) *Attorney, Agent, or Firm* — Global IP Counselors, LLP

(57) ABSTRACT

A bearing for a pump with a shaft rotating around an axial direction includes a housing and a bearing cover fixed to the housing, a bearing structure for supporting the shaft of the pump, a reservoir for a lubricant and an oil ring for transporting the lubricant and for supplying the lubricant to the bearing structure wherein the oil ring is arranged for being moved by the rotating shaft and wherein a retaining element is provided for that is fixed with respect to the housing or the cover, the retaining element being designed and arranged such that it restricts a movement of the oil ring at least in the axial direction.

18 Claims, 11 Drawing Sheets

(51) Int. Cl.
*F16C 33/66* (2006.01)
*F04D 29/047* (2006.01)

(52) U.S. Cl.
CPC ...... *F16C 33/1045* (2013.01); *F16C 2237/00* (2013.01); *F16C 2360/44* (2013.01)

(58) Field of Classification Search
USPC ........................................ 384/464, 465, 469
See application file for complete search history.

(56) References Cited

U.S. PATENT DOCUMENTS

| | | | | |
|---|---|---|---|---|
| 4,073,596 A | * | 2/1978 | Erickson | ............... F16C 33/664 |
| | | | | 415/112 |
| 4,597,679 A | | 7/1986 | Wlodkowski | |
| 5,207,512 A | | 5/1993 | Grant et al. | |
| 6,921,211 B2 | * | 7/2005 | Olsson | ................ F16C 33/6651 |
| | | | | 384/472 |
| 8,408,806 B2 | * | 4/2013 | Tecza | .................... F16C 27/066 |
| | | | | 384/405 |

* cited by examiner

Fig.5
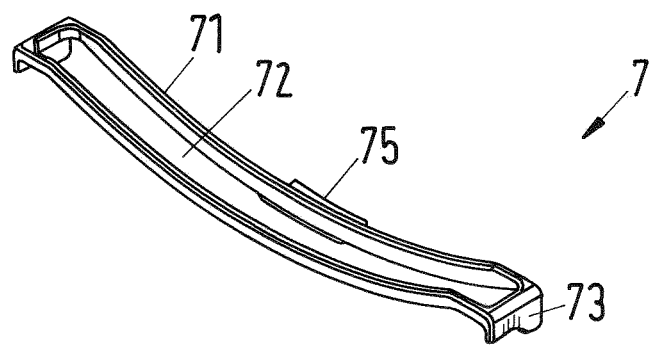
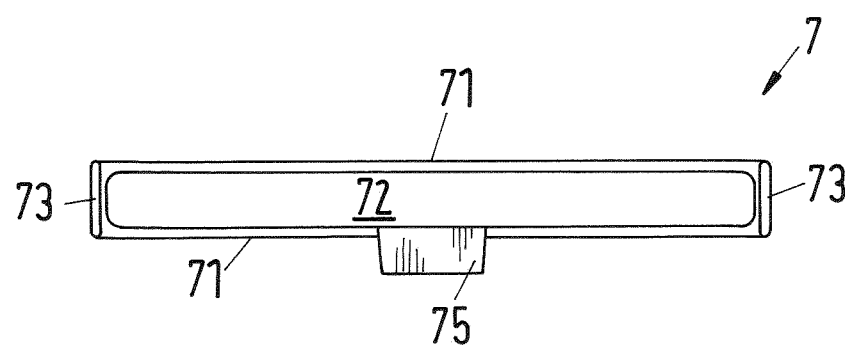

BEARING FOR A PUMP AND METHOD OF RETROFITTING A BEARING FOR A PUMP

CROSS-REFERENCE TO RELATED APPLICATIONS

This application is a U.S. National Stage application of International Application No. PCT/EP2015/072422, filed Sep. 29, 2015, which claims priority to U.S. Provisional Application No. 62/081,869, filed Nov. 19, 2014 the contents of each of which are hereby incorporated herein by reference.

BACKGROUND

Field of Invention

The invention relates to a bearing for a pump with a shaft rotating around an axial direction in accordance with the preamble of the independent device claim as well as to a pump. The invention further relates to a method of retrofitting a bearing for a pump.

Background Information

For the bearing of the rotating shaft of a pump there are many solutions known in the art. In particular in horizontally arranged pumps it is a known technology to use oil rings, also referred to as slinger rings to supply the bearing with a lubricant. The oil ring hangs loosely on the shaft or on a part that is connected torque-proof with the shaft, such as an oil thrower, and extends into a reservoir for the lubricant being arranged beneath the shaft, for example in the bottom of the bearing housing. When the shaft turns, the oil ring turns with it transporting the lubricant into the bearing. Such oil rings are used both in rolling bearings and in journal bearings.

Especially in the field of pumping hydrocarbon fluids in the oil and gas industry the pumps are often exposed to very severe operating environments. For the offshore production of oil and gas, for example, it is nowadays common practice to use floating production storage and offloading units (FPSO) because the exploration moved to deeper waters and more distant locations. FPSOs are floating vessels used for the production and processing of hydrocarbons as well as for the storage of oil. A pump installed on such vessels has to operate in a maritime environment which causes—beside other difficulties—that during operation the entire pump is no longer stationary but undergoes quite strong movements. The bumpy sea moves the vessel and therewith the pump.

Thus, the pump suffers both a pitch and a roll motion. For a horizontal pump with horizontal bearings the pitch motion results in a deviation of the pump's shaft axis from the horizontal, i.e. the bearings of the shaft are moving up and down, whereas the roll motion results in a rotational movement of the entire pump around the shaft axis of the pump. Since the orientation of the pump relative to the vessel is usually not known before installation, in the following description the pitch and roll motion has to be understood in relation to the pump rather than in relation to the vessel or the FPSO, respectively.

Until now, the known design and technology of such pumps is generally sufficient for pitch and roll angles up to 5°, i.e. compared to the standard or desired orientation of a horizontal pump during operation the shaft axis may deviate from the horizontal up to 5° and the entire pump may be tilted or rotated up to 5° around the axis of the shaft of the pump. However, the requirements on pumps for maritime applications are increasing and there is a desire to safely operate pumps even for roll and pitch angles of more than 5°. It cannot be granted that the known technology will function for larger angles. Especially in bearings using an oil ring for the lubrication of the bearing element or journal a proper lubrication is no longer assured when the angle exceeds 5°. An insufficient or lacking lubrication is detrimental to the bearing and may result in a severe damage or even a failure of the bearing and therewith of the pump. Especially in offshore applications the complete breakdown of a pump bearing or a pump is a major incident that may result in large economic losses.

SUMMARY

Based on that prior art it is an object of the invention to propose a bearing for a pump with a shaft rotating around an axial direction which assures a proper lubrication of the bearing even when the bearing and the pump experience larger deviations from the standard orientation during operation, for example by pitch or roll motions of the bearing or the pump. In particular, the bearing shall be suited for maritime applications like for pumps on FPSOs. The subject matter of the invention satisfying this object is characterized by the features of the independent claims.

Thus, according to the invention a bearing for a pump with a shaft rotating around an axial direction is proposed, the bearing comprising a housing and a bearing cover fixed to the housing, a bearing structure for supporting the shaft of the pump, a reservoir for a lubricant and an oil ring for transporting the lubricant and for supplying the lubricant to the bearing structure wherein the oil ring is arranged for being moved by the rotating shaft and wherein a retaining element is provided that is fixed with respect to the housing or the cover, the retaining element being designed and arranged such that it restricts a movement of the oil ring at least in the axial direction.

By providing the retaining element that restricts the movement of the oil ring at least with respect to the axial direction it is assured that even for tilting angles of the pump that exceed 5 degree the oil ring does not lose contact with the lubricant in the reservoir. In addition, the retaining element prevents the oil ring from making contact with the wall of the housing. Such a contact could have the result that the oil ring does no longer rotate. Thus, the retaining element constrains the oil ring in an operating position which corresponds to the position for tilting angles of the pump from zero degree to five degree so that the oil ring can continue to deliver oil to the bearing structure even at tilting angles of the pump that exceed five degree.

Since the retaining element is fixed with respect to the housing it cannot move relative to the housing but remains stationary with respect to the housing.

Furthermore, providing the retaining element for the oil ring is a very simple, efficient and economic measure that is very low in cost and ensures a proper lubrication even for larger tilting angles.

In addition, the bearing according to the invention may be realized also in existing bearings by providing them with an appropriate retaining element. Thus, the invention is also suited for retrofitting or upgrading existing bearings. The mounting of a retaining element in a bearing is an uncomplicated measure that can be easily realized without large efforts.

According to a first preferred embodiment the retaining element is extending perpendicular to the axial direction. By this structure, the retaining element extends essentially parallel to the plane surrounded by the oil ring.

It is a preferred measure for the first embodiment that the retaining element comprises two lateral bars extending parallel and being spaced from each other to define a gap in between, said gap accommodating a part of the oil ring. Thus, the movement of the oil ring is constrained by the two lateral bars of the retaining element.

Preferably each of the lateral bars is curved for extending around a part of the shaft in its circumferential direction. By this measure the guidance of the oil ring may be even improved.

It is advantageous when the two lateral bars are connected by two end pieces, wherein each end piece is located at an end of the lateral bars. These end pieces may be used to mount the retaining element to the housing of the bearing.

From the constructional point of view it is preferred when each end piece is extending perpendicular to the lateral bars.

Depending on the respective application it may facilitate the mounting of the retaining element when each end piece is essentially L-shaped.

The end pieces may be designed such that the retaining element is mounted to a side wall of the housing.

Alternatively, the end pieces may be designed such that the retaining element is mounted to a bottom of the housing. For this type of mounting the L-shaped end pieces are preferred.

In another preferred embodiment the retaining element comprises an essentially ring-shaped base body for surrounding the shaft and at least one mount extending from the base body and adapted for accommodating a part of the oil ring.

From a constructional point of view it is advantageous when the mount is essentially U-shaped. This is an easy way to constrain the movement of the oil ring with respect to the axial direction.

Regarding this embodiment it is a preferred measure that the base body of the retaining element is fixed to the bearing cover for example bolted to the bearing cover.

The bearing in accordance with the invention may be designed as a rolling bearing, in particular as a ball bearing. For this design the bearing structure comprises an inner bearing ring rotating with the shaft, an outer bearing ring being stationary with respect to the housing and rolling elements like balls or cylinders arranged between the outer and the inner bearing ring.

The bearing in accordance with the invention may also be designed as a journal bearing. Such a bearing is usually a hydrodynamic bearing, wherein the bearing structure comprises a stationary bearing surface surrounding the shaft: During operation a thin film of lubricant develops between the rotating shaft and the bearing surface of the bearing.

Furthermore, in accordance with the invention a pump is proposed comprising at least one bearing according to the invention. Such a pump is especially suited for maritime applications, for example for mounting on a FPSO, where the entire pump experiences deviations from the standard or usual orientation by tilting movements like roll or pitch motions on a vessel. In addition, the pump according to the invention is also suited for such applications where the pump is mounted in an orientation that constantly deviates from the usual orientation of operation in a stationary manner, e.g. when the pump is mounted on an oblique base.

In addition, the invention proposes a method of retrofitting a bearing for a pump with a shaft rotating around an axial direction, the bearing comprising a housing, a bearing cover fixed to the housing and an oil ring for transporting a lubricant and for supplying the lubricant to a bearing structure, comprising the steps of providing a retaining element, which is designed to restrict movement of the oil ring, arranging the retaining element such that it restricts the movement of the oil ring at least in the axial direction and fixing the retaining element with respect to the housing of the bearing or the bearing cover.

Since the retaining element is a simple element that can be easily adapted to and designed for any specific pump, existing bearings may be upgraded or improved in order to make the bearing more resistant against larger tilting motions like pitch and roll motions as explained above.

Further advantageous measures and embodiments of the invention will become apparent from the dependent claims.

BRIEF DESCRIPTION OF THE DRAWINGS

Referring now to the attached drawings which form a part of this original disclosure.

FIG. 5 is a perspective view (top) and a bottom view (bottom) of an alternative for the retaining element.

DETAILED DESCRIPTION OF THE EMBODIMENTS

Figure 1:
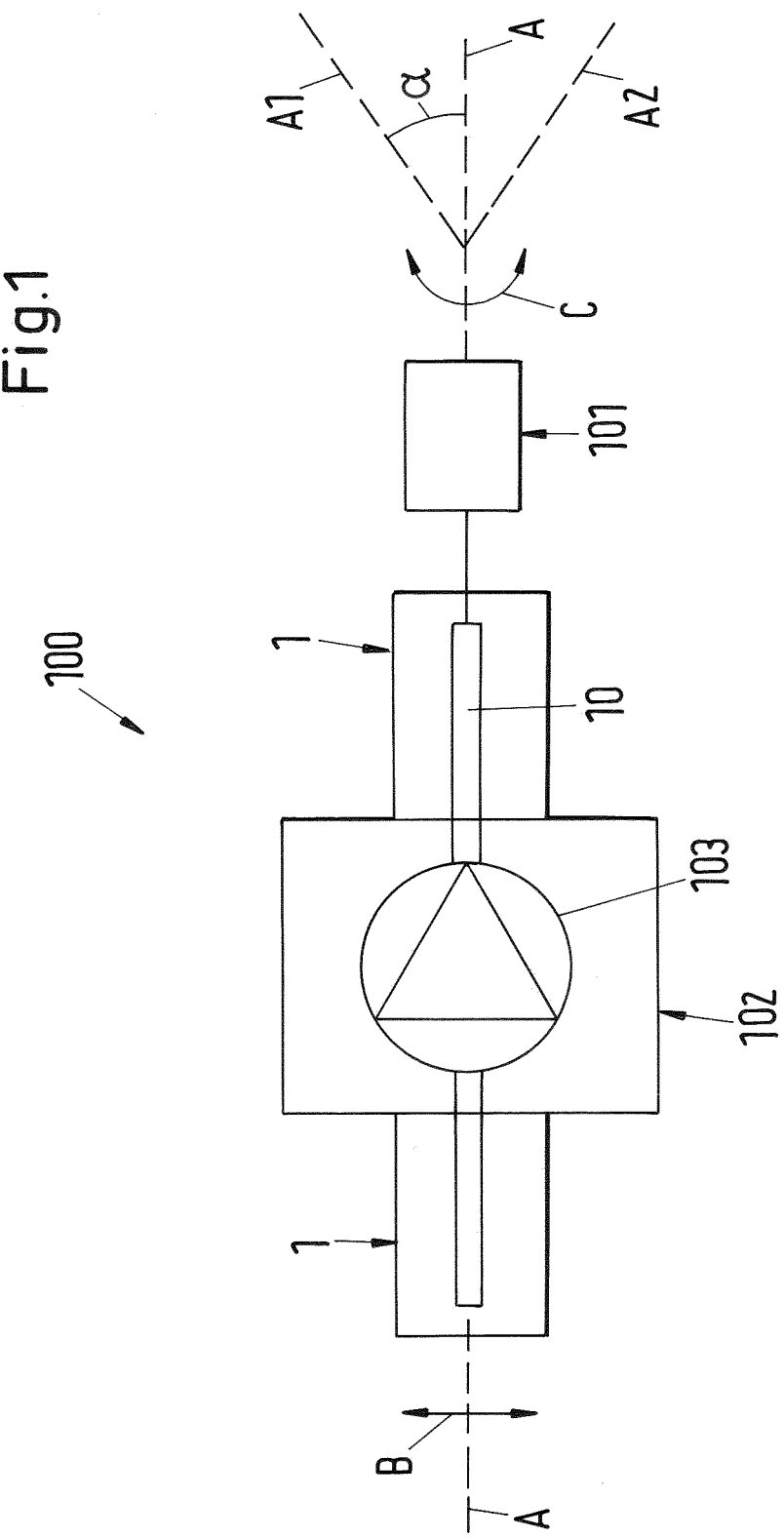
FIG. 1 is a schematic diagram of an embodiment of a pump according to the invention.

In the drawings of the different embodiments identical parts or parts having the same function or an analogously same function are designated with the same reference numerals.

The invention relates to a bearing for a pump with a rotating shaft as well as to a pump having such a bearing. FIG. 1 shows a schematic diagram of an embodiment of such a pump which is designated in its entity with reference numeral 100. In this embodiment the pump 100 is a horizontal, centrifugal between-bearing-pump as it is used for example as process pump in the oil and gas industry. The pump 100 comprises an impeller unit 102 with a centrifugal rotor 103 for conveying a fluid from an inlet to an outlet. The rotor 103 is mounted on and driven by a shaft 10 rotating around an axial direction A. On each side of the impeller unit 102 a bearing 1 supports the shaft 10. The details of the bearings 1 will be described in more detail hereinafter. Since the impeller unit 102 is arranged between the two bearings 1 the pump 100 is called a between-bearing pump. In addition, there is a drive 101, for example an electric motor, for rotating the shaft 10 of the pump 100.

It goes without saying that the invention is not restricted to between-bearing pumps or bearings 1 for such between-bearing pumps but is applicable to all kinds of pumps, especially centrifugal pumps, using oil rings for lubrication. In the following description of the preferred embodiments reference is made to the important practical application that the bearings 1 and the pump 100, respectively, are operated in a maritime environment for example on a FPSO. However, the invention is not restricted to this application. On a FPSO or any other vessel the pump 100 may experience deviations from the usual horizontal orientation of operation. These deviations may be caused by pitch and roll motions of the vessel. The pitch motion indicated by the straight arrow B in FIG. 1 results in a tilting of the entire pump 100 around an axis perpendicular to the axial direction A and perpendicular to the plane of the drawing in FIG. 1. By this motion the axis of the shaft 10 defining the axial direction A is tilted between the directions indicated by the lines A1 and A2. The tilting angle α is the angle between line A1 or A2, respectively, and the line A. The roll motion indicated by the curved arrow C causes a tilting of the entire pump 100 around the axial direction A and can be described by a tilting angle, too.

Pumps known in the art are able to handle tilting angles of up to five degree, for larger tilting angles a safe and reliable operation of the pump is no longer assured. By the bearing according to the invention a safe operation may be ensured for much larger tilting angles, for example for tilting angles of up to at least 20 degree.

Figure 2:
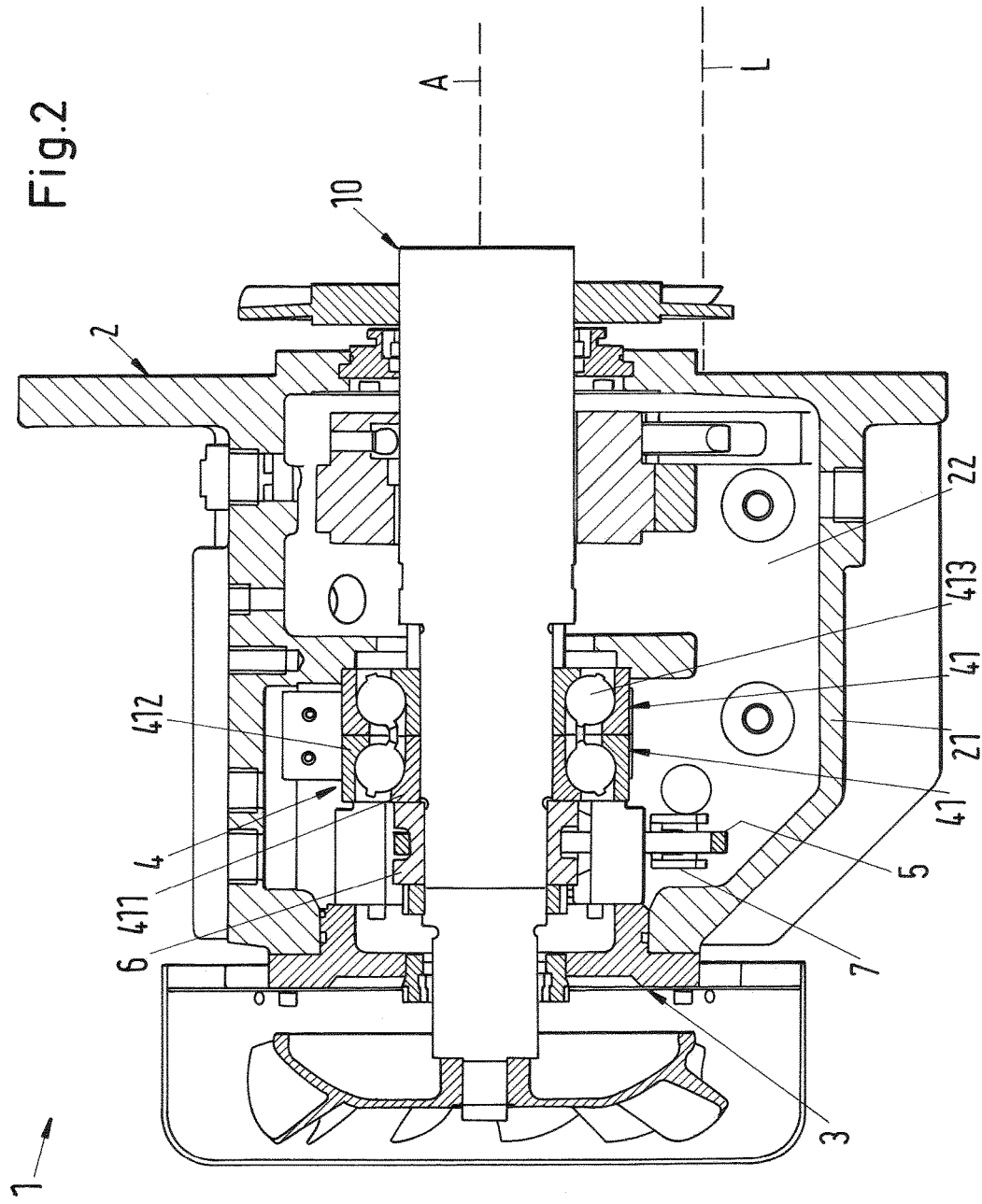
FIG. 2 is a schematic cross-sectional view of a first embodiment of a bearing according to the invention.

FIG. 2 shows a schematic cross-sectional view of a first embodiment of the bearing 1 according to the invention. The bearing 1 comprises a housing 2 and a bearing cover 3 fixed to the housing 2, for example by screws or bolts. In addition, there is a bearing structure 4 for accommodating and supporting the shaft 10 of the pump 100 in a manner that is as such known in the art. The bearing structure 4 comprises two ball bearing elements 41 each of which comprises an inner bearing ring 411, an outer bearing ring 412 and a plurality of balls 413 as rolling elements disposed between the outer bearing ring 412 and the inner bearing ring 411. The inner bearing ring 411 is connected torque-proof with the shaft 10 and the outer bearing ring 412 is stationary with respect to the housing 2. For the lubrication of the bearing structure 4 an oil ring 5 is provided. The oil ring 5 is arranged in a groove of a sleeve like oil thrower 6 being fixed on the shaft 10 and rotating with the shaft 10. At a bottom 21 of the housing 2 of the bearing 1 a reservoir 22 for a lubricant, for example an oil, is provided. During operation of the pump 100 the reservoir 22 is filled with the lubricant up to a level indicated by the line L in FIG. 2. The oil ring 5 hangs loosely from the shaft 10 and is partially submerged in the lubricant in the reservoir 22. When the shaft 10 rotates the oil ring 5 is rotating, too, thereby transporting lubricant from the reservoir 22 to the oil thrower 6 and delivering the lubricant to the bearing structure 4.

According to the invention a retaining element 7 is provided that is fixed with respect to the housing 2 and that is designed and arranged such that it restricts a movement of the oil ring 5 at least in the axial direction.

Figure 3:
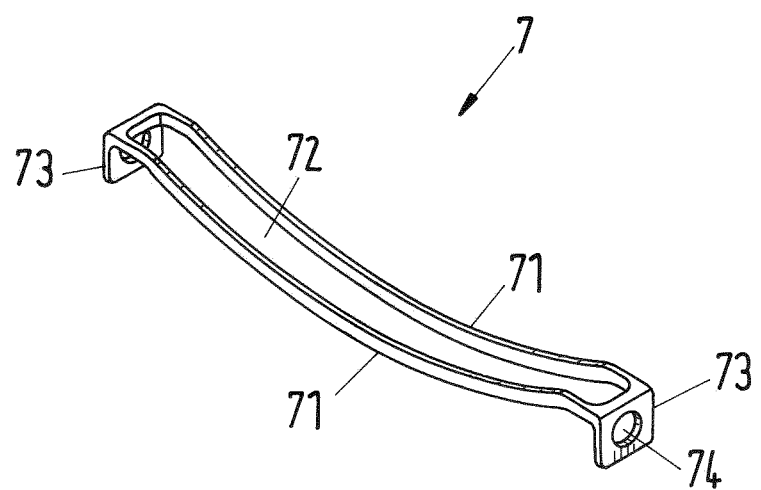
FIG. 3 is a perspective view of the retaining element of the first embodiment.

FIG. 3 shows a perspective view of the retaining element 7. The retaining element 7 comprises two lateral bars 71 extending parallel and being spaced from each other to define a gap 72 in between. The lateral bars 71 may be designed in a thin wire shape. The retaining element 7 is mounted such, that the gap 72 between the lateral bars 71 accommodates a part of the oil ring 5 as can be seen in FIG. 2 and in FIG. 4.

Each of the lateral bars 71 is curved for extending around a part of the shaft in its circumferential direction. The two lateral bars 71 are connected by two end pieces 73, wherein each end piece 73 is located at an end of the lateral bars 71. The end pieces 73 and the lateral bars 71 border an essentially quadrangular area through which the oil ring 5 enters the gap 72. Each of the end pieces is extending essentially perpendicular to the lateral bars 71. Furthermore, each of the end pieces 73 includes a hole 74 for mounting the retaining element 7 on a side wall 23 of the housing 2 by a screw.

Figure 4:
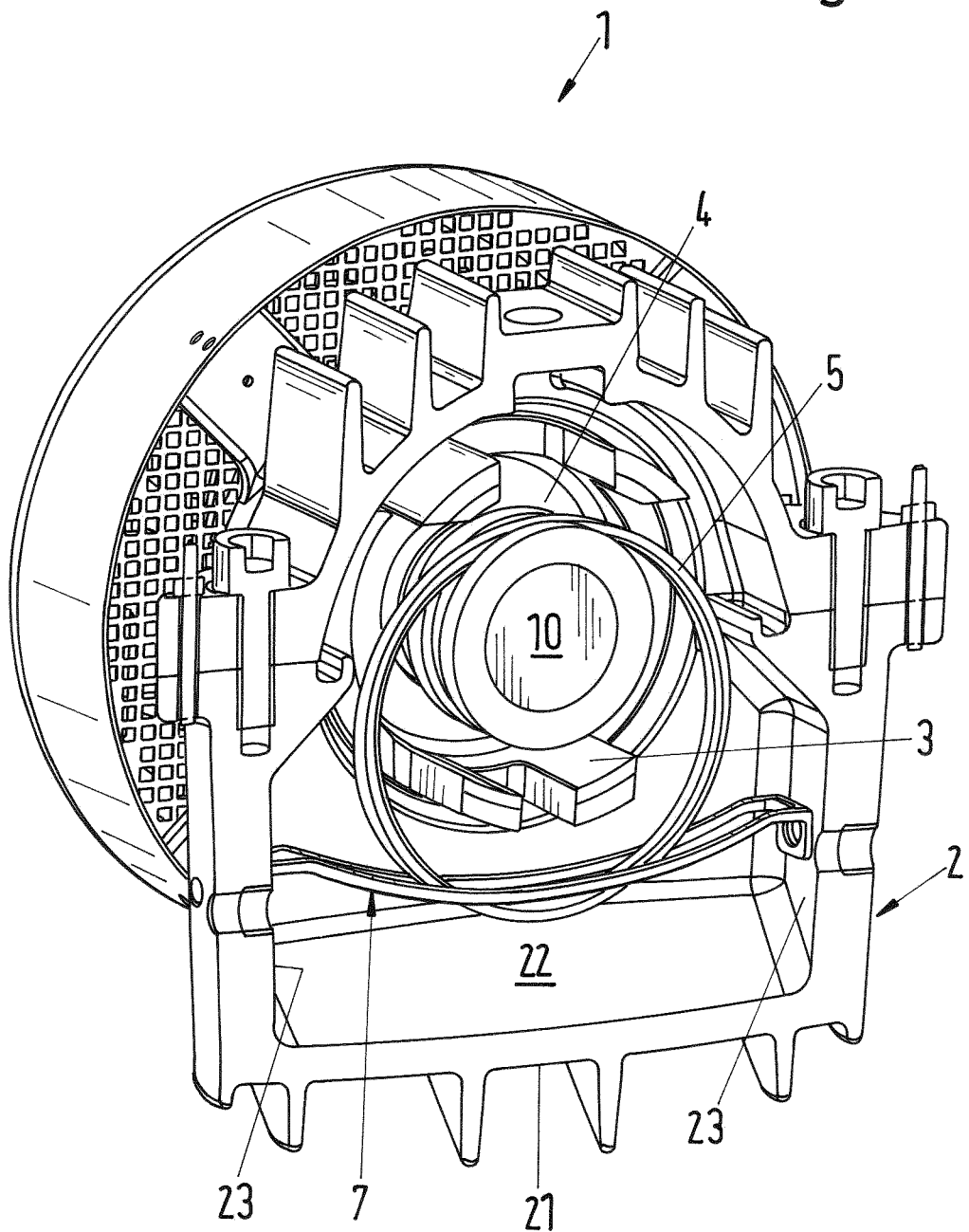
FIG. 4 is a perspective view of the first embodiment with the housing and the bearing cover partially broken away.

FIG. 4 shows a perspective view of the first embodiment of the bearing 1 wherein the housing 2 and the bearing cover 3 are partially broken away for the purpose of better understanding. The cut through the housing 2 and the bearing cover 3 in FIG. 4 is perpendicular to the axial direction A, thus that the oil ring 5 and the retaining element 7 become visible. FIG. 4 especially shows the relative position of the oil ring 5 and the retaining element 7 with the gap 72 accommodating a part of the oil ring 5. The retaining element 7 is extending perpendicular to the axial direction A between the two side walls 23 of the housing 2 and fixed to the housing 2 by screws (not shown) extending through the holes 74 of the retaining element.

During operation of the pump 100 the retainer element 7 limits the motion of the oil ring 5 relative to the shaft 10. This limitation may be both with respect to the axial direction A and with respect to motions of the oil ring 5 perpendicular to the axial direction A, for example the radial direction. In case the pump 100 and therewith the bearing 1 will suffer strong pitch or roll motions the oil ring 5—apart from its rotational movement around the shaft 10—can only move within the gap 72 between the lateral bars 71 of the retaining element 7. As soon as the oil ring 5 moves in the axial direction A to such an extent that the oil ring 5 gets in contact with one of the lateral bars 71 the oil ring 5 is prevented from moving further with respect to the axial direction A. By this it is assured that the oil ring 5 does not lose contact with the lubricant in the reservoir 22 but remains partially submerged in the lubricant. Furthermore, the retaining element 7 prevents the oil ring 5 from making contact with the wall, for example one of the side walls 23 of the housing or any other part within the housing 2. Such a contact would be detrimental because it could stop or at least considerably hinder the rotational movement of the oil ring 5 around the shaft 10. Thus, a proper and efficient transport of the lubricant from the reservoir 22 to the bearing structure and the supply of lubricant to the bearing structure are always secured even for large pitch and roll movements of the pump 100.

Preferably the retaining element 7 and in this embodiment especially the gap 72 is designed and dimensioned such that the maximum deviation of the oil ring 5 from its usual or standard operating position is limited to such a deviation that corresponds to a maximum tilting angle of five degree. Thus, even for larger tilting angles of the bearing 1 or the pump 100, for example up to 20 degree, the movement of the oil ring 5 is restricted to the +/−5° range with respect to the standard or usual operating position of the oil ring.

Accordingly, the bearing 1 according to the invention ensures a proper and efficient lubrication of the bearing structure 4 by the oil ring 5 even for such situations where the tilting angle α (roll or pitch movement) of the bearing 1 or the pump 100 exceeds the limit of 5 degree.

FIG. 5 shows in the upper part a perspective view and in the lower part a bottom view of an alternative for the retaining element 7. The main difference to the retaining element according to FIG. 3 is the mounting of the retaining element 7 with respect to the housing 2. The retaining element 7 illustrated in FIG. 5 includes a protruding tab 75 for fixing the retaining element 7 with respect to the housing 2. The tab 75 may include a hole (not shown) for receiving a screw with which the tab 75 is fixed to any flat surface or spot of the housing 2. In addition, the respective end pieces 73 do not include a hole but shaped for snuggly fitting into any crevice of the housing 2 or any other part mounted to the housing. Of course, the specific design of the end pieces 73 depends on the specific design of the bearing 1 or its housing 2. However, the skilled person will be able to find an appropriate location and an appropriate design for the end pieces 73 to enable such a fit between the end pieces 73 and a crevice or a recess within the housing 2 of the bearing 1. Just to mention one example the end pieces 73 may be designed for a tight fitment between the wall of the housing 2 and a cooling coil of the bearing 1.

Figure 6:
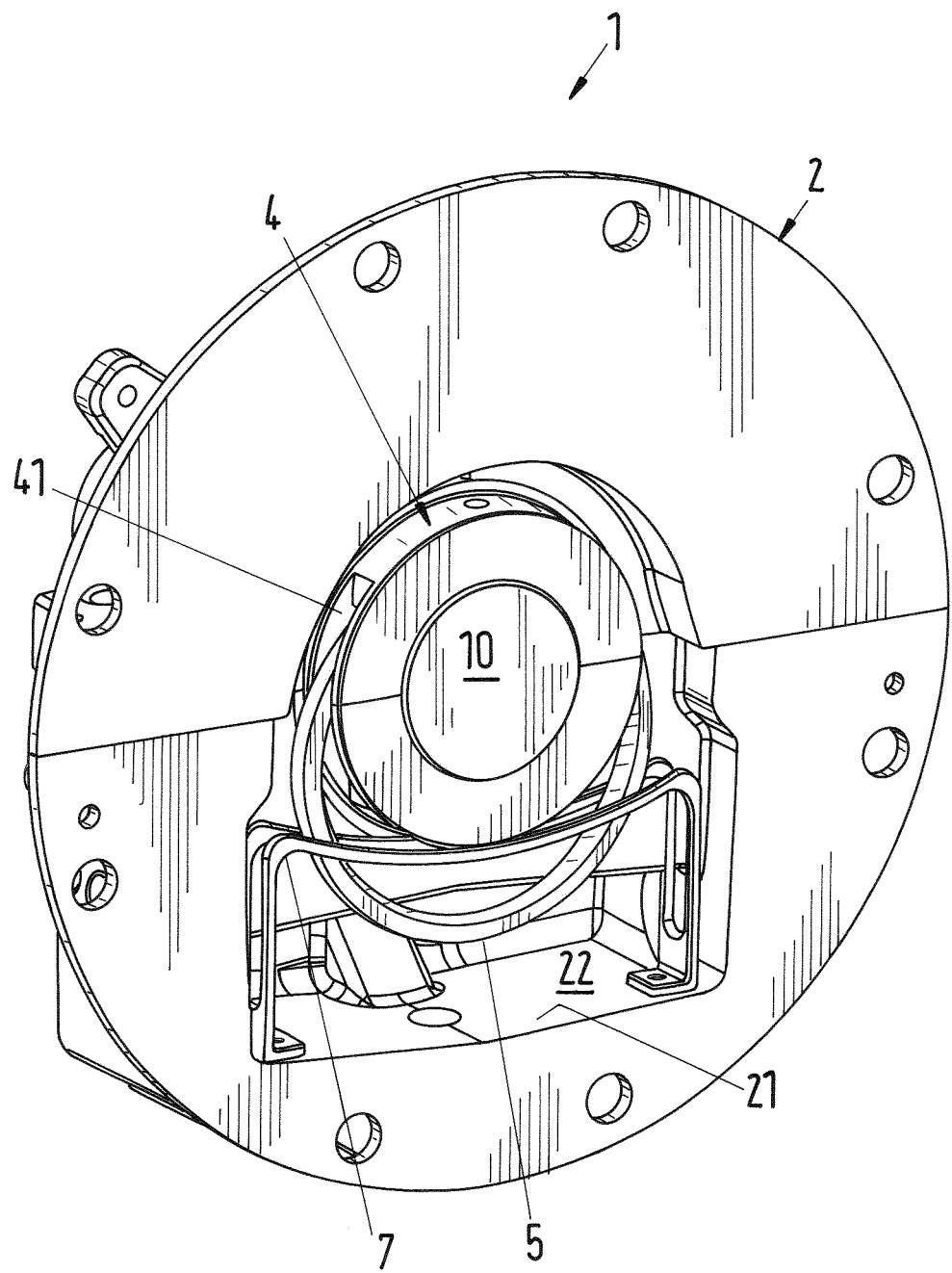
FIG. 6 is a perspective view of a second embodiment of a bearing according to the invention with the bearing cover removed.
Figure 7:
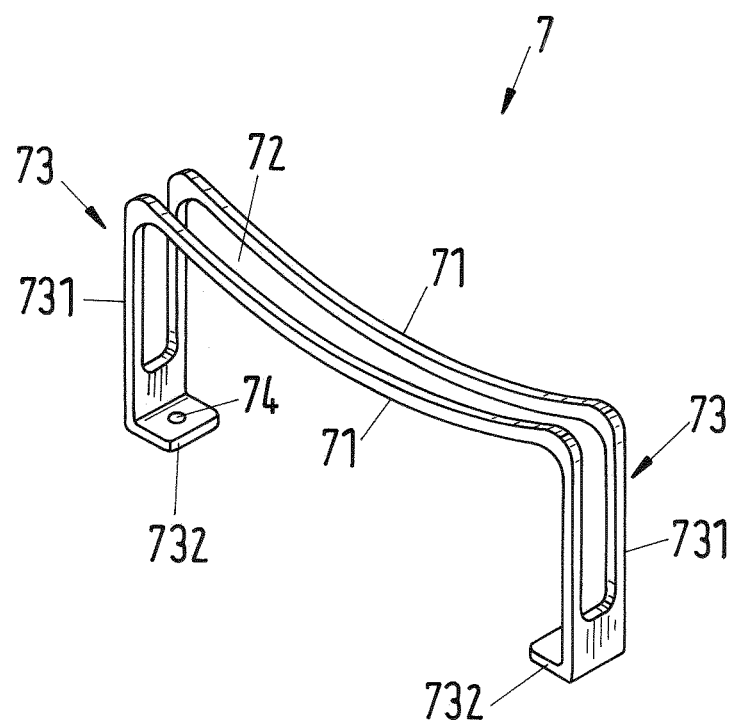
FIG. 7 is a perspective view of the retaining element of the embodiment in FIG. 6.

FIG. 6 shows a perspective view of a second embodiment of a bearing 1 wherein the bearing cover 3 is removed for the purpose of a better illustration and understanding. In addition, FIG. 7 shows a perspective view of the retaining element 7 of the second embodiment. The bearing 1 is a rolling bearing and more specifically a ball bearing with a bearing structure 4 comprising at least one bearing element 41 with a plurality of balls as rolling bodies. The oil ring 5 transports the lubricant from the reservoir 22 to the bearing structure 4 and supplies the bearing structure 4 with the lubricant.

As best seen in FIG. 7 the retaining element 7 has the two end pieces 73 connecting the two lateral bars 71. According to this embodiment each end piece 73 is essentially L-shaped, wherein the respective longer arm 731 of the L connects the two lateral bars 71 and extends essentially perpendicular to the lateral bars 71 and the respective shorter arm 732 of the L includes the hole 74 for receiving a screw (not shown) or another fixing means or device for mounting the retaining element 7 to the housing 2. This embodiment is especially suited for mounting the retaining element 7 to the bottom 21 of the housing (see FIG. 6).

Figure 8:
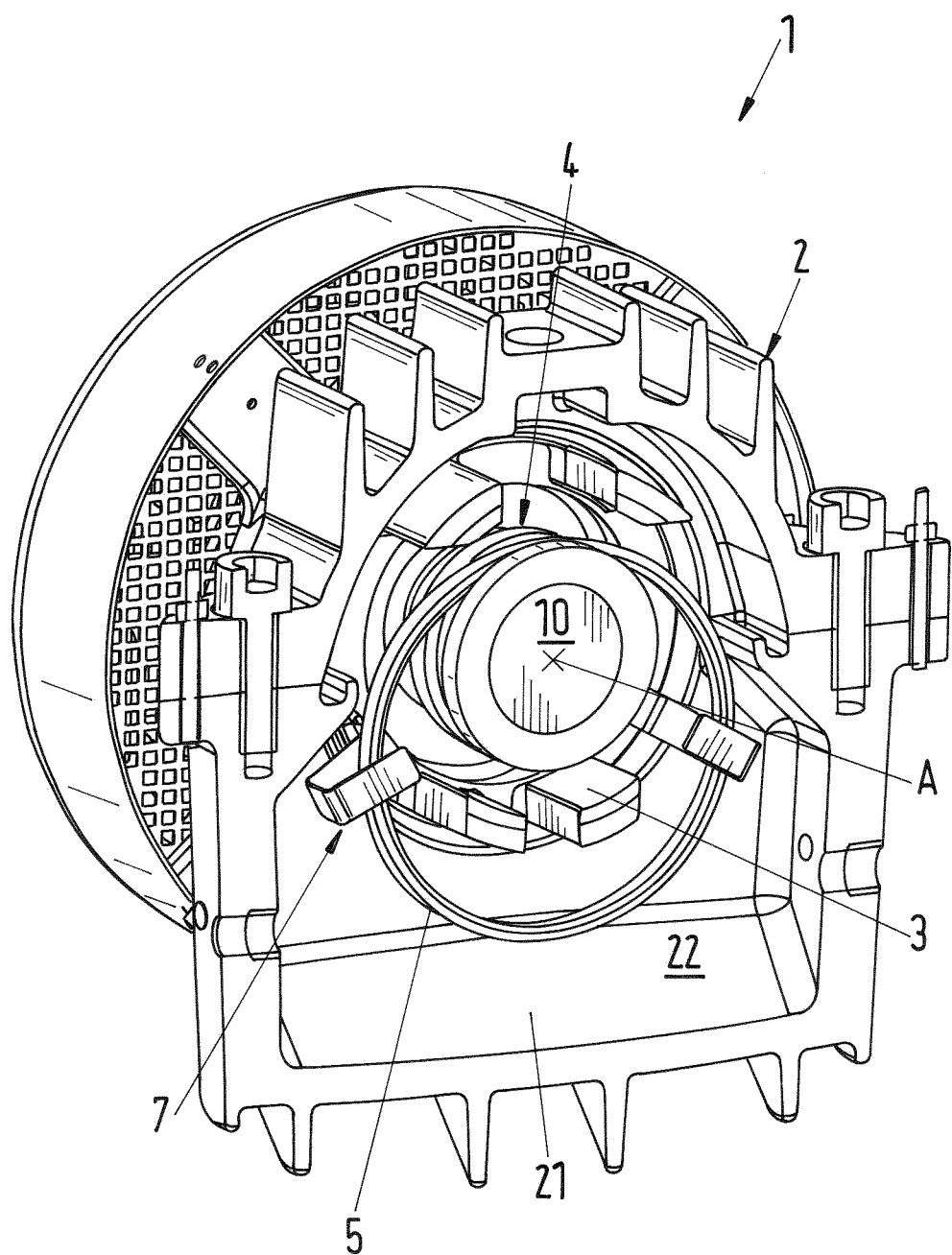
FIG. 8 is similar to FIG. 4, but for a third embodiment of a bearing according to the invention.
Figure 9:
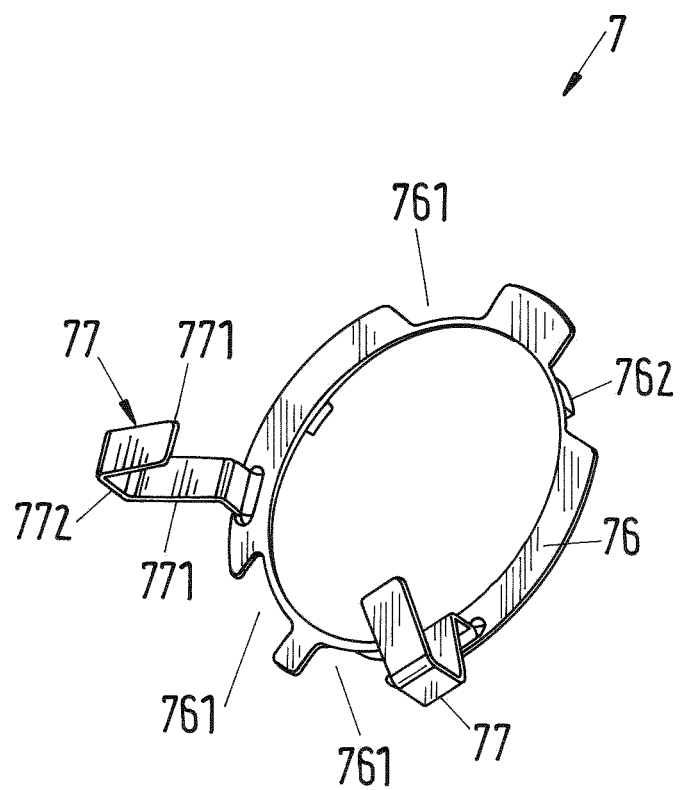
FIG. 9 is a perspective view of the retaining element of the embodiment in FIG. 8.

FIG. 8 shows a third embodiment of the bearing 1 in an analogous illustration as the illustration in FIG. 4, i.e. the housing 2 and the bearing cover 3 are partially broken away for the purpose of better understanding. The cut through the housing 2 and the bearing cover 3 in FIG. 8 is perpendicular to the axial direction A, thus that the oil ring 5 and the retaining element 7 become visible. The third embodiment differs from the first embodiment mainly by the design and the mounting of the retaining element 7. The retaining element 7 of the third embodiment is shown in a perspective view in FIG. 9. The retaining element 7 comprises an essentially ring-shaped base body 76 for surrounding the shaft 10 and at least one mount 77 extending from the base body 76 and adapted for accommodating a part of the oil ring 5 as illustrated in FIG. 8. In this embodiment the retaining element has two mounts 77 each of which is essentially U-shaped or formed as a hook. The mount 77 has two arms 771 extending parallel or slightly slanted with respect to each other as well as a middle part 772 connecting the arms 771. The space delimited by the two arms 771 and the middle part 772 fulfills essentially the same function as the gap 72 in the first embodiment, that is said space constrains the movement of the oil ring 5 relative to the shaft 10. The distance of the two mounts 77 measured in the circumferential direction of the base body 76 is less than half the circumference of the base body 76. By this, it is possible that after mounting of the retaining element 7 both mounts 77 are located beneath the axis of the shaft 10 thus constraining the movement of the oil ring 5 at two different locations. Of course it is also possible to have more than two mounts 77 or to design the mounts 77 in another manner.

Figure 10:
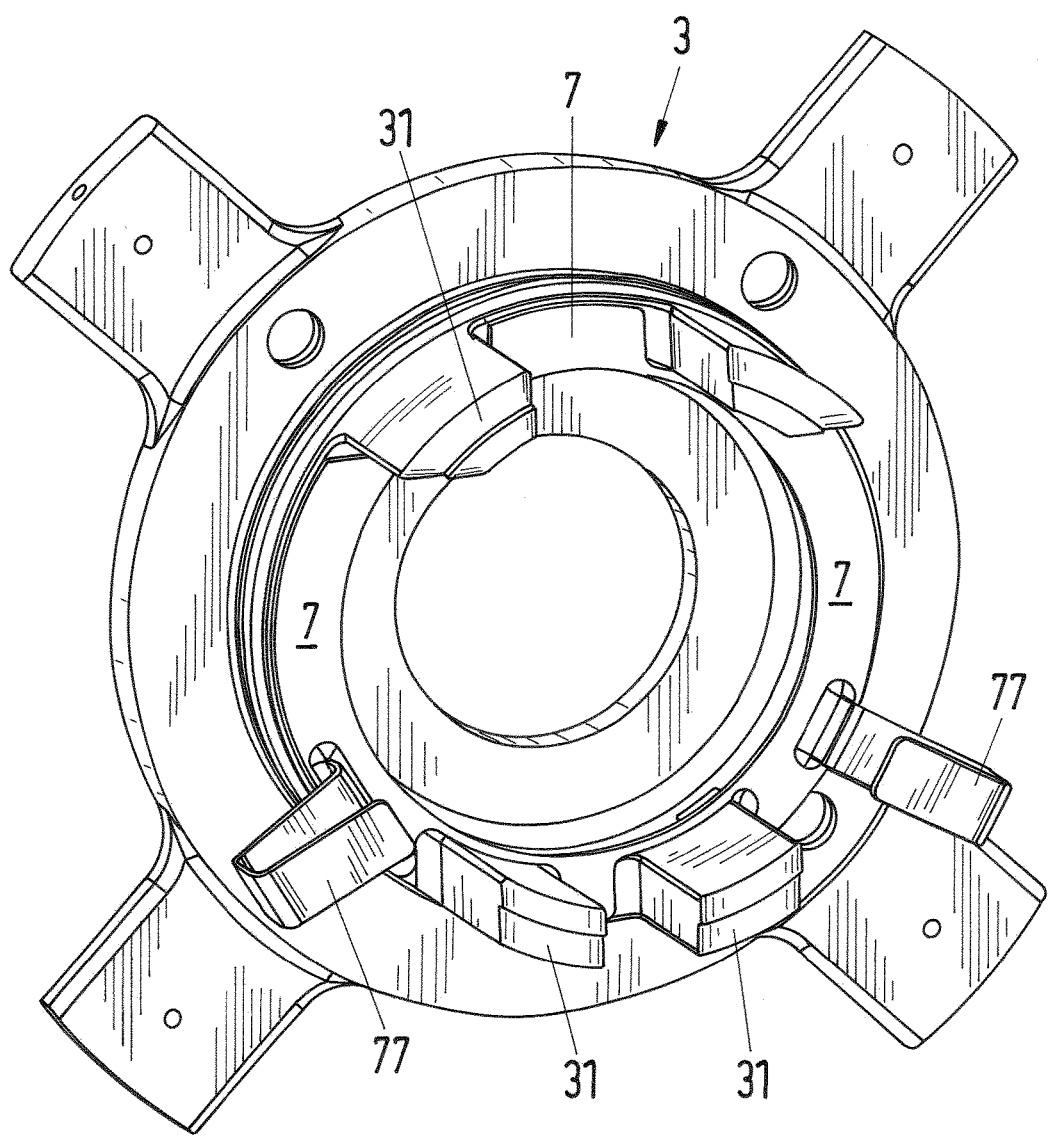
FIG. 10 is a perspective view of the bearing cover and the retaining element of the third embodiment.

In this third embodiment, the retaining element 7 is designed to be fixed to the bearing cover 3. FIG. 10 shows a perspective view of the bearing cover 3 and the retaining element 7. The base body 76 includes several recesses 761 along its outer circumference. These recesses 761 are located and designed such that they accommodate corresponding protrusions 31 provided at the bearing cover 3 as can be best seen in FIG. 10. By the engagement of the protrusions 31 with the recesses 761 of the base body 76 the retaining element 7 is secured against rotations around the axial direction A. Optionally, the base body 76 of the retaining element 7 may include at least one mounting tab 762 extending essentially perpendicular to the base body 76 and in the opposite direction as the mounts 77. The mounting tab 762 or tabs 762 are located and designed such that upon mounting to the bearing cover 3 each mounting tab 762 engages or cooperates with a recess or a notch in the bearing cover 3.

It goes without saying that the specific arrangement and design both of the recesses 761 and the mounting tab 762 depends of the design and the geometry of the specific bearing cover 3 the retaining element 7 is mounted to. However, the skilled person has no problems to adapt the design of the retaining element 7 according to the specific application. As an additional securing measure the retaining element 7 may be bolted or glued to the bearing cover 3, for example by screws. After the retaining element 7 has been mounted to the bearing cover 3 the bearing cover 3 may be fixed to the housing 2 of the bearing 1.

Figure 11:
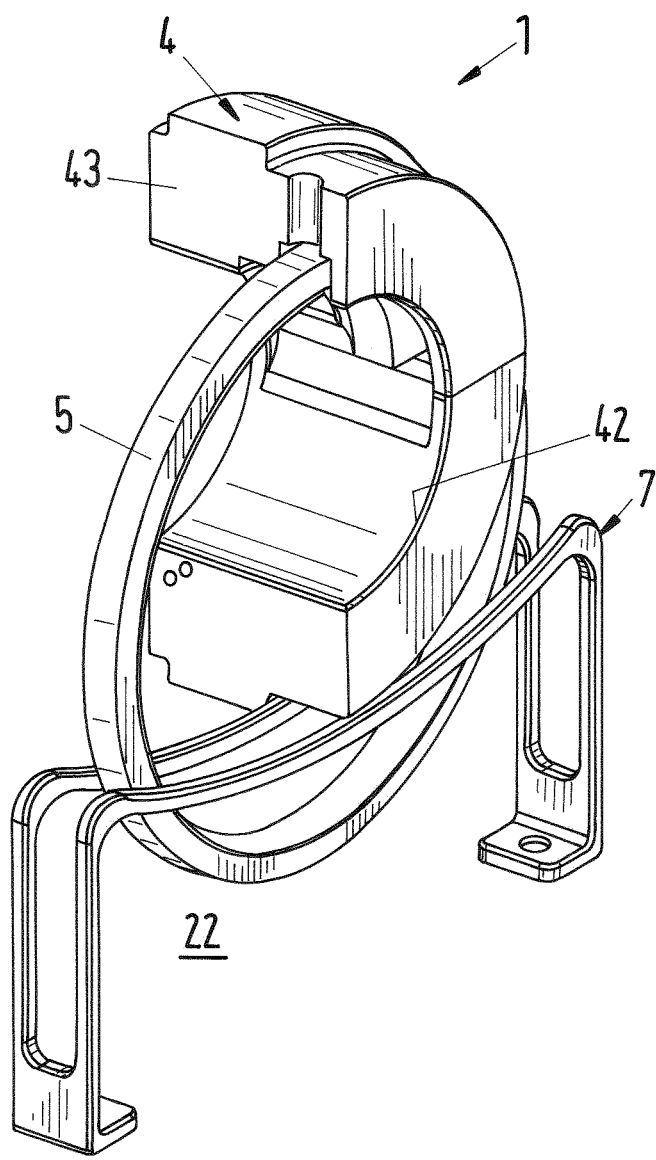
FIG. 11 is a perspective view (partially broken away) illustrating a fourth embodiment of a bearing according to the invention.

FIG. 11 illustrates in a perspective view a fourth embodiment of a bearing according to the invention. For the purpose of a better understanding the representation of the housing 2 of the bearing 1 and the shaft 10 has been omitted and only a half of the bearing structure 4 is shown.

The fourth embodiment is designed as a journal bearing or friction bearing. The bearing structure 4 comprises a bearing sleeve 42 surrounding the shaft 10 (not shown) and mounted to a carrier 43 which in turn is fixed to the housing 2 (not shown) of the bearing 1. In a journal bearing the bearing structure 4 does not comprise any parts rotating with the shaft 10, but the bearing of the shaft 10 is based upon the friction between the rotating shaft 10 and the stationary bearing sleeve 42. For the lubrication especially between the bearing sleeve 42 and the rotating shaft 10 the oil ring 5 transports the lubricant from the reservoir 22 to the bearing structure 4. Upon rotation of the shaft 10 a thin lubricating film is generated between the shaft 10 and the bearing sleeve 42. The journal bearing 1 is a hydrodynamic bearing.

The retaining element 7 of the fourth embodiment corresponds to the retaining element of the second embodiment (see FIG. 7) and therefore does not need further explanations.

Of course, all the other embodiments of the retaining element 7 are also suited in an analogous manner for journal type bearings.

Each of the specific features or measures that are explained with reference to a specific embodiment of the invention is also applicable for the respective other embodiments in an equivalent or analogous manner.

Since the retaining element 7 discussed with reference to the different embodiments is a separate individual part it may be easily used for retrofitting or upgrading existing bearings or bearings that are already designed or standard bearings with fixed design.

The specific suited design and the geometry of the retaining element 7 depends on the specific design of the bearing. However it does not impose any undue burden to the skilled person to adapt the geometry and the design of the retaining element 7 to a specific application.

The retaining element 7 may be made of metal, plastic, a compound material or any other suited material. For example, the retaining element 7 may be made of a polycarbonate plastic. Preferably, the retaining element 7 is made of a material having a low friction with respect to the oil ring 5, whereas—during operation—the lubricant on the oil ring 5 will help to reduce the friction between the oil ring and the retaining element 7. A low friction between the oil ring 5 and the retaining element 7 has the advantage that the retaining element 7 does not considerably hinder the rotational movement of the oil ring 5.

The invention claimed is:

1. A bearing for a pump with a shaft rotating around an axial direction, the bearing comprising:
    a housing;
    a bearing cover fixed to the housing;
    a bearing structure configured to support the shaft of the pump;
    a reservoir for a lubricant;
    an oil ring configured to transport the lubricant and to supply the lubricant to the bearing structure, the oil ring arranged to be moved by the rotating shaft; and
    a retaining element fixed with respect to the housing or the cover, the retaining element being configured and arranged so as to restrict movement of the oil ring at least in the axial direction and wherein the retaining element is arranged only on a same side below the shaft as the reservoir.

2. The bearing in accordance with claim 1, wherein the retaining element extends perpendicular to the axial direction.

3. The bearing in accordance with claim 1, wherein the retaining element comprises two lateral bars extending parallel and being spaced from each other to define a gap therebetween, the gap accommodating a part of the oil ring.

4. The bearing in accordance with claim 3, wherein each of the lateral bars is curved so as to extend around a part of the shaft in a circumferential direction.

5. The bearing in accordance with claim 1, wherein the retaining element is mounted to a side wall of the housing.

6. The bearing in accordance with claim 1, wherein the retaining element is mounted to a bottom of the housing.

7. The bearing in accordance with claim 1, wherein the retaining element comprises an essentially ring-shaped base body configured to surround the shaft and at least one mount extending from the base body and configured to accommodate a part of the oil ring.

8. The bearing in accordance with claim 7, wherein the mount is essentially U-shaped.

9. The bearing in accordance with claim 7, wherein the base body of the retaining element is fixed to the bearing cover.

10. The bearing in accordance with claim 1, wherein the bearing is a rolling bearing or a journal bearing.

11. The bearing in accordance with claim 10, wherein the bearing is a ball bearing.

12. A pump comprising:
    at least one bearing according to claim 1.

13. A bearing for a pump with a shaft rotating around an axial direction, the bearing comprising:
    a housing;
    a bearing cover fixed to the housing;
    a bearing structure configured to support the shaft of the pump;
    a reservoir for a lubricant;
    an oil ring configured to transport the lubricant and to supply the lubricant to the bearing structure, the oil ring arranged to be moved by the rotating shaft; and
    a retaining element fixed with respect to the housing or the cover, the retaining element being configured and arranged so as to restrict movement of the oil ring at least in the axial direction and the retaining element being arranged on a same side below the shaft as the reservoir,
    wherein the retaining element comprises two lateral bars extending parallel and being spaced from each other to define a gap there between, the gap accommodating a part of the oil ring, and
    wherein the two lateral bars are connected by two end pieces, and each end piece is located at an end of the lateral bars.

14. The bearing in accordance with claim 13, wherein each end piece extends perpendicular to the lateral bars.

15. The bearing in accordance with claim 14, wherein each end piece is essentially L-shaped.

16. A bearing for a pump with a shaft rotating around an axial direction, the bearing comprising:
    a housing;
    a bearing cover fixed to the housing;
    a bearing structure configured to support the shaft of the pump;
    a reservoir for a lubricant;
    an oil ring configured to transport the lubricant and to supply the lubricant to the bearing structure, the oil ring arranged to be moved by the rotating shaft; and
    a retaining element fixed with respect to the housing or the cover, the retaining element being configured and arranged so as to restrict movement of the oil ring at least in the axial direction and the retaining element being arranged on a same side below the shaft as the reservoir, wherein the retaining element is a curved member and only partially surrounds the shaft.

17. A bearing for a pump with a shaft rotating around an axial direction, the bearing comprising:
    a housing;
    a bearing cover fixed to the housing;
    a bearing structure configured to support the shaft of the pump;
    a reservoir for a lubricant;
    an oil ring configured to transport the lubricant and to supply the lubricant to the bearing structure, the oil ring arranged to be moved by the rotating shaft; and
    a retaining element fixed with respect to the housing or the cover, the retaining element being configured and arranged so as to restrict movement of the oil ring at least in the axial direction, the retaining element comprising two lateral bars extending parallel and being spaced from each other to define a gap therebetween, the gap accommodating a part of the oil ring, and the two lateral bars being connected by two end pieces, and each end piece being located at an end of the lateral bars.

18. A method of retrofitting a bearing for a pump with a shaft rotating around an axial direction, the bearing comprising a housing, a bearing cover fixed to the housing, an oil ring for transporting a lubricant and for supplying the lubricant to a bearing structure, and a reservoir for the lubricant, the method comprising:
    providing a retaining element to restrict movement of the oil ring;

wherein the retaining element is arranged only on a same side below the shaft as the reservoir so as to restrict the movement of the oil ring at least in the axial direction; and fixing the retaining element with respect to the housing of the bearing or the bearing cover.

* * * * *